(12) United States Patent
Ikeda et al.

(10) Patent No.: US 11,736,794 B2
(45) Date of Patent: Aug. 22, 2023

(54) IMAGING APPARATUS AND CONTROL METHOD FOR IMAGING APPARATUS

(71) Applicant: CANON KABUSHIKI KAISHA, Tokyo (JP)

(72) Inventors: Makoto Ikeda, Kanagawa (JP); Yusuke Shirakawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/316,082

(22) Filed: May 10, 2021

(65) Prior Publication Data

US 2021/0360170 A1  Nov. 18, 2021

(30) Foreign Application Priority Data

May 12, 2020 (JP) ................. 2020-083952

(51) Int. Cl.
*H04N 23/63* (2023.01)
*G06T 7/70* (2017.01)
*G06T 7/60* (2017.01)
*H04N 5/262* (2006.01)
*G06T 7/20* (2017.01)
*H04N 23/69* (2023.01)

(52) U.S. Cl.
CPC ............ *H04N 23/635* (2023.01); *G06T 7/20* (2013.01); *G06T 7/60* (2013.01); *G06T 7/70* (2017.01); *H04N 5/2628* (2013.01); *H04N 23/69* (2023.01)

(58) Field of Classification Search
CPC ......... H04N 5/232945; H04N 5/23296; H04N 5/2628; H04N 5/23254; H04N 23/635; H04N 23/69; H04N 23/6811; G06T 7/20; G06T 7/60; G06T 7/70
See application file for complete search history.

(56) References Cited

U.S. PATENT DOCUMENTS

| | | | |
|---|---|---|---|
| 8,063,945 B2 | 11/2011 | Hoshino | |
| 8,284,256 B2 | 10/2012 | Miyata | |
| 2015/0103185 A1* | 4/2015 | Sasaki | H04N 17/002 348/169 |
| 2017/0102715 A1* | 4/2017 | Shi | H04N 5/23296 |
| 2018/0108144 A1* | 4/2018 | Tsunashima | H04N 23/00 |
| 2019/0007624 A1* | 1/2019 | Wang | H04N 5/23296 |
| 2019/0037143 A1* | 1/2019 | Tsubusaki | H04N 5/23296 |
| 2019/0045122 A1* | 2/2019 | Chiaki | G06T 1/20 |

FOREIGN PATENT DOCUMENTS

| | | |
|---|---|---|
| JP | 2000-347275 A | 12/2000 |
| JP | 2006-245793 A | 9/2006 |
| JP | 2008-288797 A | 11/2008 |

\* cited by examiner

*Primary Examiner* — Lin Ye
*Assistant Examiner* — Tuan H Le
(74) *Attorney, Agent, or Firm* — Cowan, Liebowitz & Latman, P.C.

(57) ABSTRACT

An imaging apparatus includes: a detection unit configured to detect a position of a subject, which is a target of trimming in an image; a setting unit configured to set a determination frame that separates a first region, which includes an edge of the image, and a second region, which is a region of the image excluding the first region, from each other; and a generation unit configured to generate a trimming image to notify a user that the subject is likely to move out of an imaging range of the image, in a case where the position of the subject is included in the first region.

16 Claims, 13 Drawing Sheets

| MOVING SPEED | MARGIN RATIO OF DETERMINATION FRAME |
|---|---|
| <1% | 5% |
| <3% | 8% |
| 3%~ | 10% |

| SIZE | SIZE COEFFICIENT OF DETERMINATION FRAME |
|---|---|
| <5% | ×1 |
| <10% | ×1.2 |
| 10%~ | ×1.5 |

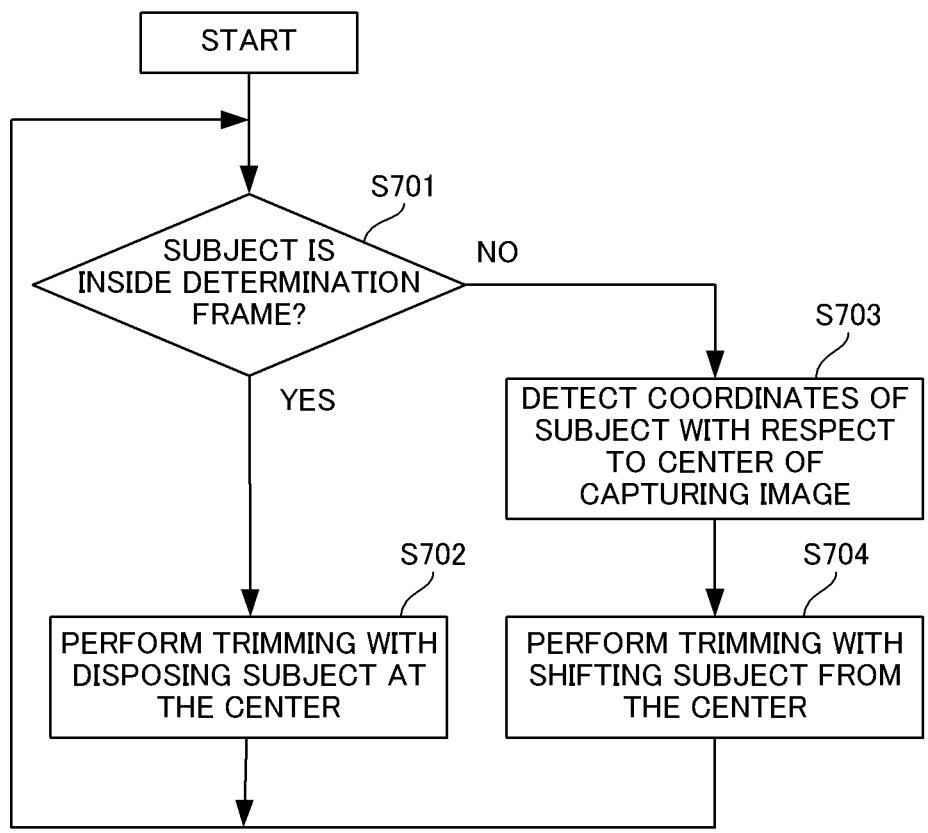

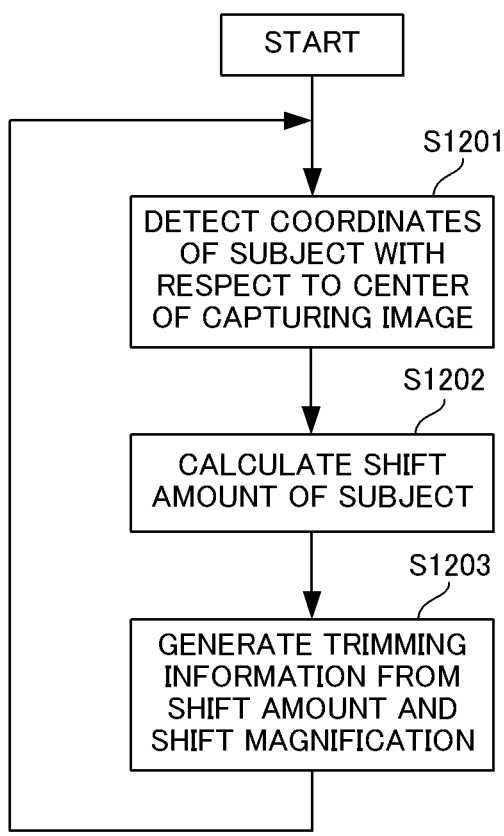

FIG.14A

| MOVING SPEED | MOVING SPEED SHIFT MAGNIFICATION Kv |
|---|---|
| <1% | 1.00 |
| <3% | 1.05 |
| 3%~ | 1.10 |

FIG.14B

| SIZE | SIZE SHIFT MAGNIFICATION Kz |
|---|---|
| <5% | 1.00 |
| <10% | 1.03 |
| 10%~ | 1.05 |

IMAGING APPARATUS AND CONTROL METHOD FOR IMAGING APPARATUS

BACKGROUND OF THE INVENTION

Field of the Invention

The present invention relates to an imaging apparatus that performs digital processing on an image captured by an imaging system and displays the image, and a control method therefor.

Description of the Related Art

In a case of viewing a moving subject with zooming in an imaging apparatus, such as a digital camera and electronic binoculars, a user can continue stable observation without following the movement of the subject, by trimming the subject while tracking the subject.

Japanese Patent Application Publication No. 2008-288797, for example, discloses a technique to track a subject and perform trimming, taking the moving direction of the subject into consideration. Further, Japanese Patent Application Publication No. 2000-347275 discloses a technique to prevent a tracking subject from moving out of an image capturing screen (hereafter may be referred to as "frame out") by cancelling a trimming zoom function in a case where the following subject moves from a specific region within the image capturing screen to outside the specific region.

In the prior art disclosed in Japanese Patent Application Publication No. 2008-288797, however the user may lose track of the subject without noticing the frame out of the moving subject. In the case of the prior art disclosed in Japanese Patent Application Publication No. 2000-347275, the trimming zoom function is cancelled if the subject is about to frame out. In this case, the user does not lose track of the subject, but has difficulty in continuously observing the subject at a predetermined size.

SUMMARY OF THE INVENTION

The present invention provides an imaging apparatus that supports a user continuously observing a moving subject without a frame out, while trimming the subject.

An imaging apparatus of the present invention includes: a detection unit configured to detect a position of a subject, which is a target of trimming in an image; a setting unit configured to set a determination frame that separates a first region, which includes an edge of the image, and a second region, which is a region of the image excluding the first region, from each other; and a generation unit configured to generate a trimming image to notify a user that the subject is likely to move out of an imaging range of the image, in a case where the position of the subject is included in the first region.

Further features of the present invention will become apparent from the following description of exemplary embodiments with reference to the attached drawings.

BRIEF DESCRIPTION OF THE DRAWINGS

FIG. 7 is a flow chart exemplifying the trimming processing according to Embodiment 1;

FIG. 12 is a flow chart exemplifying trimming processing according to Embodiment 2;

FIG. 14A and FIG. 14B are tables for explaining a shift magnification of the subject according to Embodiment 2.

DESCRIPTION OF THE EMBODIMENTS

Preferred embodiments of the present invention will be described in detail with reference to the accompanying drawings.

Embodiment 1

Configuration of Imaging Apparatus

Figure 1:
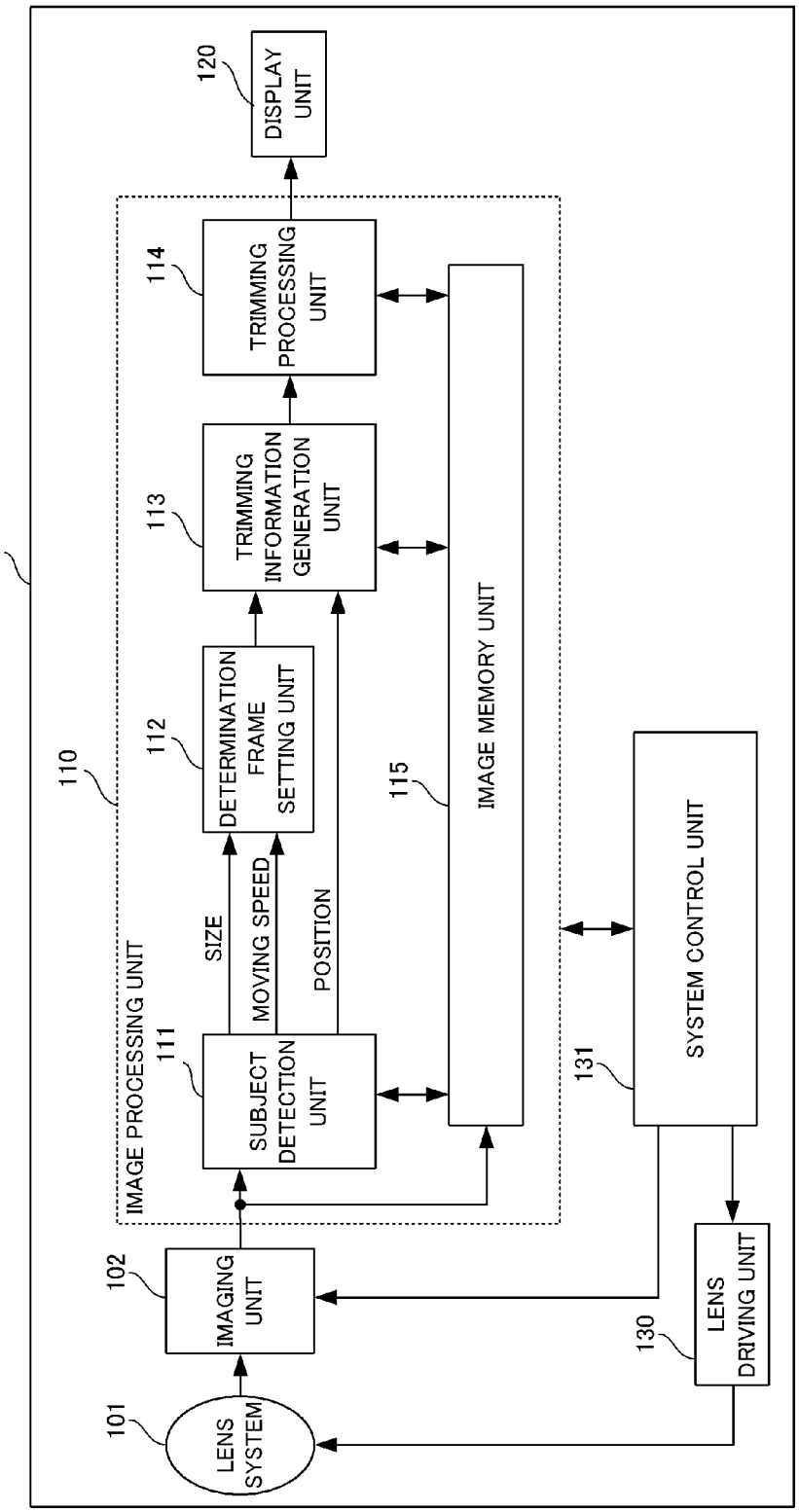
FIG. 1 is a block diagram depicting a configuration example of an imaging apparatus according to Embodiment 1.

FIG. 1 is a block diagram depicting a configuration example of an imaging apparatus 100 according to Embodiment 1. In the example in FIG. 1, the imaging apparatus 100 includes a lens system 101, an imaging unit 102, an image processing unit 110, a display unit 120, a lens driving unit 130 and a system control unit 131.

The lens system 101 is constituted of a plurality of lenses. The lens system 101 is driven by the lens driving unit 130. The lens driving unit 130 drives the lens system 101 to adjust focus and zoom. A subject image acquired via the lens system 101 is formed on an imaging surface of the imaging unit 102.

The imaging unit 102 is constituted of a CMOS sensor, a CCD sensor and the like. The imaging unit 102 photoelectrically converts a subject image to generate electric signals, whereby the image data is outputted to the image processing unit 110.

The image processing unit 110 includes a subject detection unit 111, a determination frame setting unit 112, a trimming information generation unit 113, a trimming processing unit 114, and an image memory unit 115. The image memory unit 115 is a storage unit constituted of a DRAM, an SRAM and the like. The image memory unit 115 stores image data captured by the imaging unit 102.

The subject detection unit 111 extracts a subject from image data stored in the image memory unit 115, and calculates the position (coordinates) and size of the subject in the capturing image. The subject detection unit 111 also calculates the moving speed of the subject based on the change amount of the coordinates of the subject in a predetermined time.

The determination frame setting unit 112 sets a determination frame in a capturing image based on information on the size and moving speed of the subject. The determination frame is a frame that separates a region including edges of the capturing image (first region) and a region that includes the center of the captured image, and excludes the first region (second region). Hereafter the first region may also be referred to as an edge region.

The trimming information generation unit 113 generates trimming information, which is information for specifying a trimming range in a capturing image based on whether the position of the subject is inside or outside the determination frame. The trimming information includes, for example, information on the coordinates of the center of a rectangle surrounding a trimming target subject (hereafter may also be referred to as coordinates of the center of the subject), and the size of the trimming range. The trimming information may also include the coordinates of four corners of the trimming range.

In a case where the subject is included in the edge region, the trimming information generation unit 113 generates trimming information to notify the user that the subject is likely to move out of the imaging range of the capturing image. The trimming information includes information on the direction in which the subject is likely to move out of the imaging range of the capturing image, and information on the display position of the subject with respect to the center of the trimming image.

In the case where the trimming processing by the imaging apparatus 100 is set to ON, the trimming processing unit 114 generates a trimming image in which the subject is trimmed based on the trimming information. In a case where the trimming processing is set to OFF, on the other hand, the trimming processing unit 114 outputs the image data to the display unit 120 without performing the trimming processing.

In the case where the trimming processing is set to ON, the display unit 120 displays a trimming image generated by the trimming processing unit 114. In the case where the trimming processing is set to OFF, the display unit 120 displays the original image data, where the trimming processing is not performed.

The system control unit 131 can implement the functions of the lens driving unit 130, the imaging unit 102 and the image processing unit 110 by reading and executing control programs recorded in the non-volatile memory. Each functional unit may or may not be an independent hardware unit. At least two functional units may be implemented by a common hardware unit. Each of a plurality of functions of one functional unit may be implemented by an independent hardware unit. At least two functions of one functional unit may be implemented by one common hardware unit.

Operation of Imaging Apparatus

An operation of the imaging apparatus 100 according to Embodiment 1 will be described with reference to FIG. 2 to FIG. 10. In Embodiment 1, the imaging apparatus 100 sets a determination frame based on the moving speed and size of a subject, and determines whether the position of the subject is inside or outside the determination frame, whereby the trimming range is specified.

(1. Detection of Subject)

Detection of a subject will be described with reference to FIG. 2 and FIG. 3. The subject detection unit 111 periodically detects the coordinates (tracking coordinates) of the center of a tracking target subject and the size of the subject in the capturing image, and calculates the moving speed of the subject.

Figure 2:
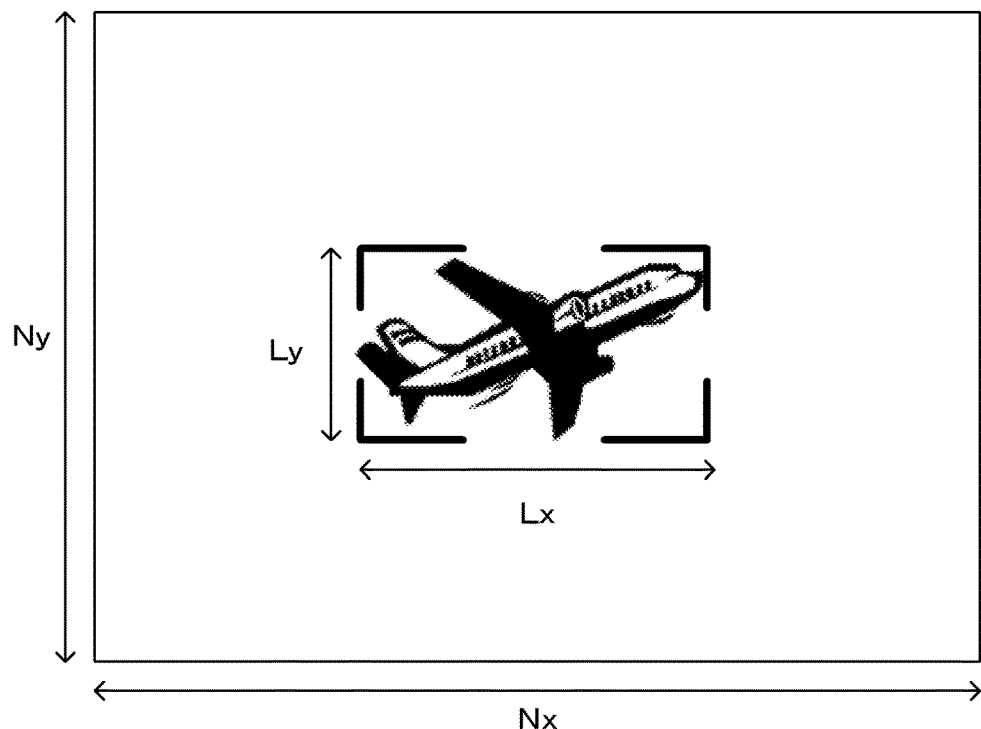
FIG. 2 is a diagram for explaining detection of a size of a subject.

FIG. 2 is a diagram for explaining detection of the size of the subject. In Embodiment 1, the information on the size of the subject includes a size of the subject in the X axis direction and a size of the subject in the Y axis direction. Here the size of the subject in the X axis direction is calculated as a ratio of a number of pixels (Lx) of a subject (a rectangle enclosing the subject) in the X axis direction with respect to a number of pixels (Nx) of the capturing image in the X axis direction. In the same manner, the size of the subject in the Y direction is calculated as a ratio of a number of pixels (Ly) of the subject in the Y axis direction with respect to a number of pixels (Ny) of the capturing image in the Y axis direction.

For example, in a case where a number of pixels Nx of the capturing image in the X axis direction is 2000 and a number of pixels Lx of the subject in the X axis direction is 100, the size of the subject in the X axis direction is calculated as (Lx/Nx)×100=5%. In a case where the number of pixels Ny of the capturing image in the Y axis direction is 1500 and a number of pixels Ly of the subject in the Y axis direction is 75, the size of the subject in the Y axis direction is calculated as (Ly/Ny)×100=5%.

The size of the subject may be any value that can express a relative size with respect to the size of the capturing image. In the description in Embodiment 1, the size of the subject is expressed as a ratio of a number of pixels of the subject with respect to a number of pixels of the capturing image in the X axis direction and the Y axis direction respectively.

Figure 3:
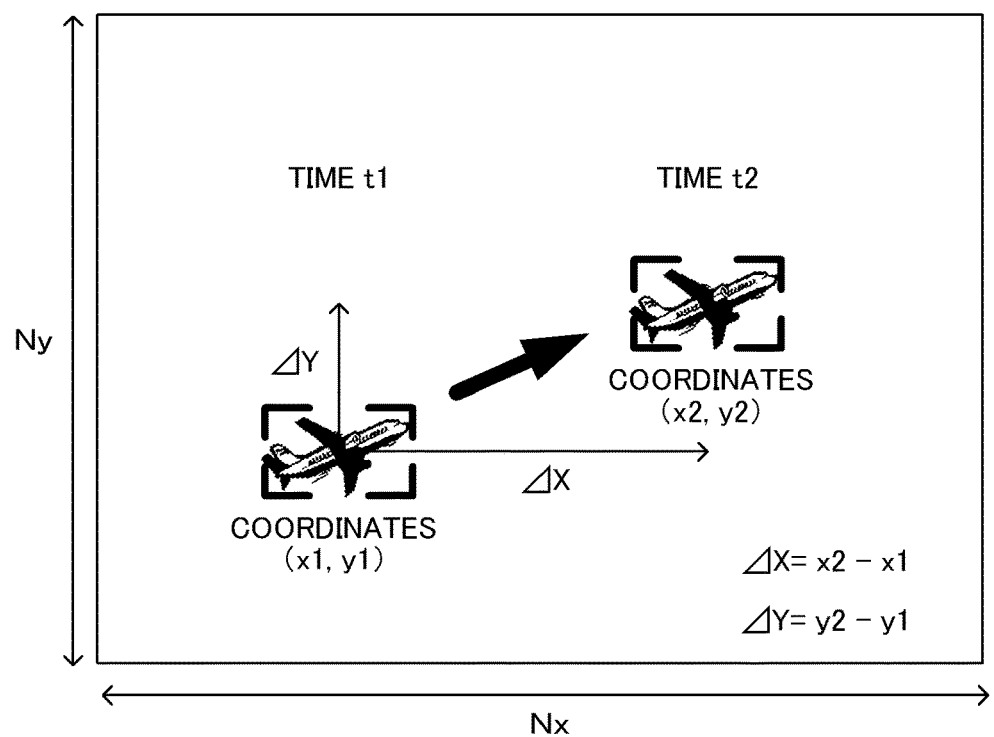
FIG. 3 is a diagram for explaining detection of the moving speed of the subject.

FIG. 3 is a diagram for explaining detection of the moving speed of the subject. In Embodiment 1, information on the moving speed of the subject includes the moving speed in the X axis direction and the moving speed in the Y axis direction. Here the moving speed of the subject in the X axis direction is calculated as a ratio of a change amount (ΔX) of the tracking coordinate of the subject in the X axis direction with respect to a number of pixels (Nx) of the capturing image in the X axis direction. In the same manner, the moving speed of the subject in the Y axis direction is calculated as a ratio of a change amount (ΔY) of the tracking coordinate of the subject in the Y axis direction with respect to a number of pixels (Ny) of the capturing image in the Y axis direction. In FIG. 3, the positive direction of the X axis direction is the direction of the arrow mark indicating the change amount (ΔX) of the tracking coordinate in the X axis direction. The positive direction of the Y axis direction is the direction of the arrow mark indicating the change amount (ΔY) of the tracking coordinate in the Y axis direction.

In order to calculate the moving speed of the subject, the imaging apparatus 100 acquires the capturing image (image data of the subject) at predetermined time intervals. In the case of FIG. 3, the imaging apparatus 100 acquires a capturing image 1 at time t1, and acquires a capturing image 2 at time t2. It is assumed that the tracking coordinates of the capturing image 1 of the subject are (x1, y1) and the tracking coordinates of the capturing image 2 of the subject are (x2, y2).

The change amount of the tracking coordinate in the X axis direction from time t1 to time t2 is ΔX=x2−x1. The moving speed of the subject in the X axis direction is calculated as (ΔX/Nx)×100. In the same manner, the change amount of the tracking coordinate in the Y axis direction from time t1 to time t2 is ΔY=y2−y1. The moving speed of the subject in the Y axis direction is calculated as (ΔY/Ny)×100.

The moving speed of the subject may be any value that can express a change amount of the tracking coordinates with respect to the size of the capturing image. In the description of Embodiment 1, the moving speed of the subject is expressed as a ratio of the change amount of the tracking coordinates of the subject with respect to a number of pixels of the capturing image in the X axis direction and the Y axis direction respectively.

(2. Setting of Determination Frame)

Setting of the determination frame by the determination frame setting unit 112 will be described. The determination frame is a frame that separates an edge region (first region) and the region other than the edge region (second region), and is set to determine whether a position of a subject is included in the edge region. In the case where the position of the subject is included in the edge region, the subject is more likely to move out (frame out) of the range of the capturing image. Therefore in the case where the position of the subject is included in the edge region, the imaging apparatus 100 generates trimming information to notify the user that the subject is likely to move out of the imaging range of the capturing image.

A subject is more likely to frame out as the moving speed thereof increases. A subject is also more likely to frame out as the size thereof increases, since the distance from the tracking coordinates at the center of the subject to the edge of the subject increases. By setting the determination frame more to the inner side in accordance with the moving speed or the size of the subject, the imaging apparatus 100 can more quickly notify the user that the subject is approaching the boundary of the capturing image. In other words, the imaging apparatus 100 sets the size of the determination frame smaller as the moving speed of the subject is faster, or as the size of the subject is larger. A specific example of the method of setting the determination frame will be described with reference to FIG. 4A, FIG. 4B, FIG. 5A, FIG. 5B and FIG. 6.

(2.1 Setting of Determination Frame Based on Moving Speed of Subject)

Figures 4A, 4B:
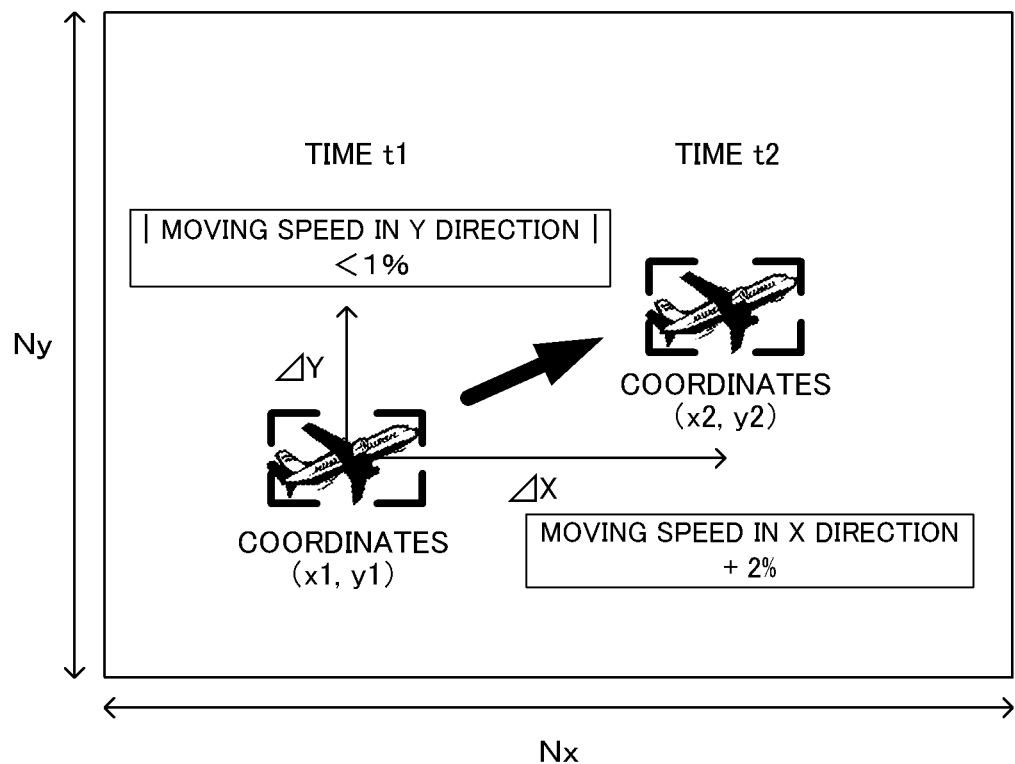
FIG. 4A and FIG. 4B are a diagram and a table for explaining the setting of a determination frame based on the moving speed of the subject.

FIG. 4A and FIG. 4B are a diagram and a table for explaining the setting of the determination frame based on the moving speed of the subject. FIG. 4A is a diagram exemplifying the moving speed information. FIG. 4B is an example of a reduction ratio to calculate a margin width to reduce the determination frame with respect to the moving speed of the subject (hereafter referred to as "margin ratio"). In Embodiment 1, the margin width is expressed by a number of pixels between the determination frame and the edge of the capturing image, and is calculated by multiplying a number of pixels on each side of the capturing image by a margin ratio in accordance with the moving speed. In a case where the determination frame is a rectangle, the margin width between each side of the determination frame and the edge of the capturing image is adjusted in accordance with the magnitude of a component of the moving speed of the subject along the direction of each side.

The moving speed of the subject is calculated by the subject detection unit 111, as described in FIG. 3. The moving speed of the subject in the X axis direction is expressed by a ratio of the change amount (ΔX) of the tracking coordinate of the subject in the X axis direction with respect to a number of pixels (Nx) of the capturing image in the X axis direction, and in the case of FIG. 4A, the moving speed is +2% (2% in the positive direction). The moving speed of the subject in the Y axis direction is expressed by a ratio of the change amount (ΔY) of the tracking coordinate of the subject in the Y axis direction with respect to a number of pixels (Ny) of the capturing image in the Y axis direction, and in the case of FIG. 4A, the moving speed is less than 1% in the Y axis positive direction and the Y axis negative direction respectively.

The margin ratio of the determination frame indicated in FIG. 4B is a ratio of the margin width (number of pixels) of the determination frame with respect to the width (number of pixels) of the capturing image, and is applied to the X axis positive direction, X axis negative direction, Y axis positive direction and Y axis negative direction respectively. The margin ratio indicated in FIG. 4B is applied to a number of pixels (Nx) of the capturing image in the X axis direction in the case of the X axis positive direction and X axis negative direction, and is applied to a number of pixels (Ny) of the capturing image in the Y axis direction in the case of the Y axis positive direction and Y axis negative direction.

On the X axis positive direction side of the capturing image, the determination frame is set to the inner side of the edge by a number of pixels of the Nx×margin ratio, with respect to the moving speed in the X axis positive direction. On the X axis negative direction side of the capturing image, the determination frame is set to the inner side of the edge by a number of pixels of the Nx×margin ratio, with respect to the moving speed in the X axis negative direction. For example, in a case where the moving speed in the X axis positive direction is calculated as 5%, the moving speed in the X axis negative direction is −5%, and the margin width corresponding to the respective moving speed is set to the X axis positive direction side of the capturing image and the X axis negative direction side of the capturing image respectively.

In the same manner, on the Y axis positive direction side of the capturing image, the determination frame is set to the inner side of the edge by a number of pixels of the Ny×margin ratio, with respect to the moving speed in the Y axis positive direction. On the Y axis negative direction side of the capturing image, the determination frame is set to the inner side of the edge by a number of pixels of the Ny×margin ratio, with respect to the moving speed in the Y axis negative direction. The margin width corresponding to the respective moving speed is set to the Y axis positive direction side of the capturing image and the Y axis negative direction side of the capturing image respectively.

For example, in the X axis direction, the moving speed in the X axis positive direction is calculated as 2%, as indicated in FIG. 4A, and the margin ratio in the X axis positive direction is set to 8%, as indicated in FIG. 4B. In the X axis positive direction, the determination frame is set to the inner side of the edge of the capturing image by a number of pixels of Nx×8%. Since the subject moves in the positive direction, the moving speed in the X axis negative direction is −2%, that is, smaller than 1%. Therefore, the margin ratio in the X axis negative direction is 5%, as indicated in FIG. 4B, and in the X axis negative direction, the determination frame is set to the inner side of the edge of the capturing image by a number of pixels of Nx×5%.

In the Y axis direction, the moving speed in the Y axis positive direction and in the Y axis negative direction are calculated as less than 1% respectively, as indicated in FIG. 4A. The margin ratio of the determination frame is 5% for both the Y axis positive direction and the Y axis negative direction, as indicated in FIG. 4B. In the Y axis positive direction, the determination frame is set to the inner side of the edge of the capturing image by a number of pixels of Ny×5%, and in the Y axis negative direction, the determination frame is also set to the inner side of the edge of the capturing image by a number of pixels of Ny×5%.

(2.2 Setting Determination Frame Based on Size of Subject)

Figures 5A, 5B:
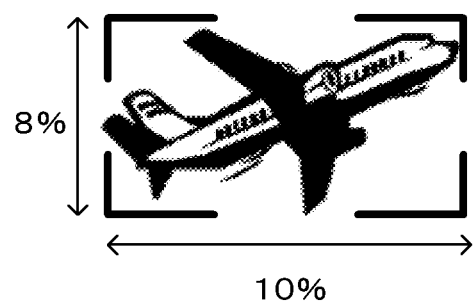
FIG. 5A and FIG. 5B are a diagram and a table for explaining the setting of a determination frame based on the size of the subject.

FIG. 5A and FIG. 5B are a diagram and a table for explaining the determination frame based on the size of the subject. FIG. 5A is a diagram exemplifying the size information. FIG. 5B is an example of a size coefficient to adjust the margin ratio of the determination frame with respect to the size of the subject. In Embodiment 1, the margin width is calculated by multiplying a margin width calculated based on the moving speed by the size coefficient corresponding to the size of the subject. In a case where the determination frame is a rectangle, the margin width between each side of the determination frame and the edge of the capturing image is adjusted in accordance with the size along a direction of each side of the subject.

The size of the subject is calculated by the subject detection unit 111, as described in FIG. 2. The size of the subject in the X axis direction is calculated as a ratio of a number of pixels (Lx) of the subject (rectangle enclosing the subject) in the X axis direction, with respect to a number of pixels (Nx) of the capturing image in the X axis direction. In the case of FIG. 5A, the size of the subject in the X axis direction is calculated as 10%. The size of the subject in the Y axis direction is calculated as a ratio of a number of pixels (Ly) of the subject in the Y axis direction, with respect to a number of pixels (Ny) of the capturing image in the Y axis direction. In the case of FIG. 5A, the size of the subject in the Y axis direction is calculated as 8%.

The size coefficient of the determination frame indicated in FIG. 5B is a coefficient by which the margin ratio, which was set in FIG. 4B, is multiplied in accordance with the size of the subject. The size coefficient is applied to the X axis direction and the Y axis direction independently. The determination frame setting unit 112 multiplies the margin ratios in the X axis positive direction and X axis negative direction which were set in FIG. 4B, by a size coefficient corresponding to the size of the subject in the X axis direction. The determination frame setting unit 112 multiplies the margin ratios in the Y axis positive direction and Y axis negative direction by a size coefficient corresponding to the size of the subject in the Y axis direction.

In the case where the size in the X axis direction is calculated as 10%, as indicated in FIG. 5A, the size coefficient with respect to the X axis positive direction and X axis negative direction are set to 1.5, as indicated in FIG. 5B. In the case where the size of the Y axis direction is calculated as 8%, as indicated in FIG. 5A, the size coefficients with respect to the Y axis positive direction and Y axis negative direction are set to 1.2, as indicated in FIG. 5B.

(2.3 Specific Example of Setting Determination Frame)

Figure 6:
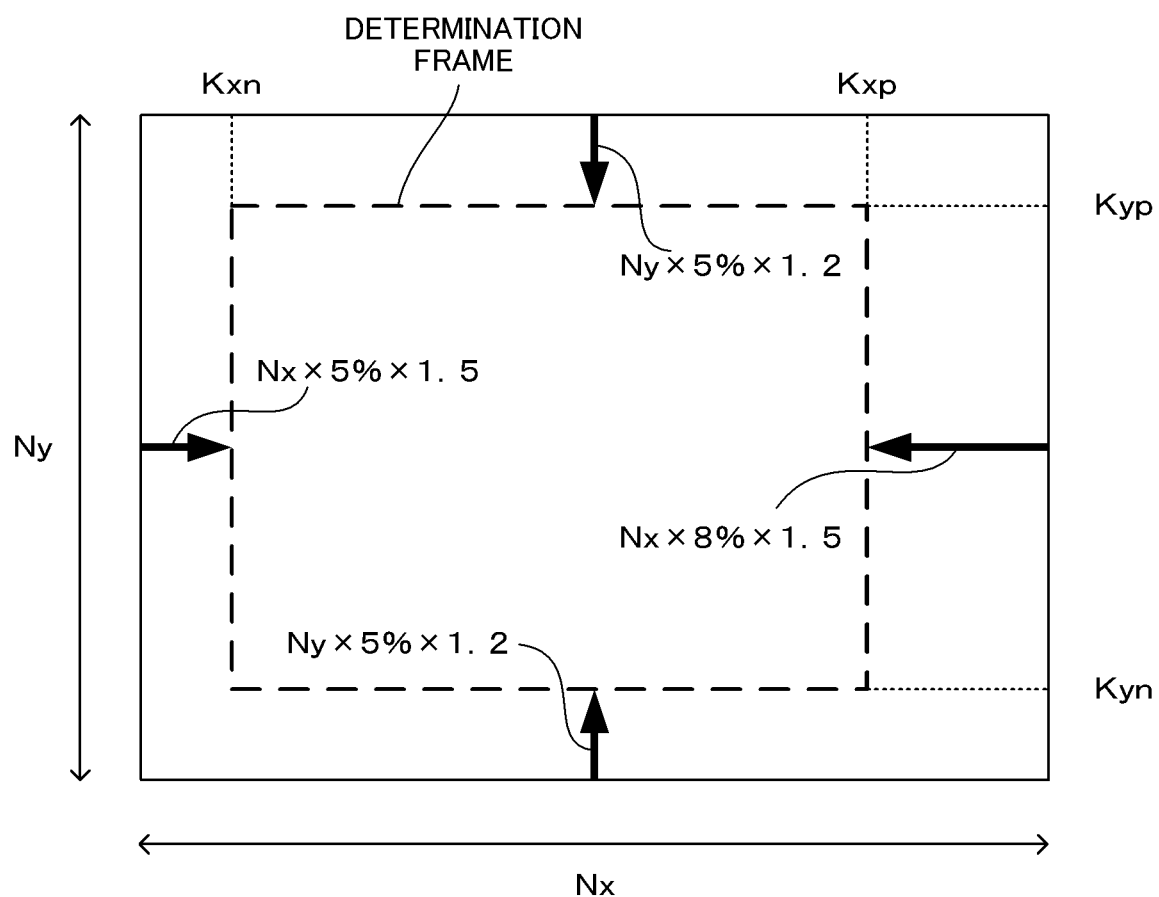
FIG. 6 is a diagram exemplifying the setting of a determination frame.

FIG. 6 is a diagram exemplifying the setting of the determination frame based on the examples in FIG. 4A, FIG. 4B, FIG. 5A and FIG. 5B. As indicated in FIG. 4A, FIG. 4B, FIG. 5A and FIG. 5B, the margin ratio in the X axis positive direction is 8%, and the size coefficient in the X axis direction is 1.5. The x coordinate Kxp of the determination frame in the X axis positive direction is set to the inner side of the edge of the capturing image on the X axis positive direction side by a number of pixels of Nx×8%×1.5. For example, if a number of pixels of the capturing image is 2000, then the x coordinate Kxp in the X axis positive direction is set to the inner side by 2000×8%×1.5=240 pixels.

Further, as indicated in FIG. 4A, FIG. 4B, FIG. 5A and FIG. 5B, the margin ratio in the X axis negative direction is 5%, and the size coefficient in the X axis direction is 1.5. The x coordinate Kxn of the determination frame in the X axis negative direction is set to the inner side of the edge of the capturing image on the X axis negative direction side by a number of pixels of Nx×5%×1.5. For example, if a number of pixels of the capturing image is 2000, then the x coordinate Kxn in the X axis negative direction is set to the inner side by 2000×5%×1.5=150 pixels.

In the same manner, as indicated in FIG. 4A, FIG. 4B, FIG. 5A and FIG. 5B, the margin ratio in the Y axis positive direction is 5%, and the size coefficient in the Y axis direction is 1.2. The y coordinate Kyp of the determination frame in the Y axis positive direction is set to the inner side of the edge of the capturing image on the Y axis positive direction side by a number of pixels of Ny×5%×1.2. Further, as indicated in FIG. 4A, FIG. 4B, FIG. 5A and FIG. 5B, the margin ratio in the Y axis negative direction is 5%, and the size coefficient in the Y axis direction is 1.2. The y coordinate Kyn of the determination frame in the Y axis negative direction is set to the inner side of the edge of the capturing image on the Y axis negative direction side by a number of pixels of Nx×5%×1.2.

Embodiment 1 described above is an example of using both the moving speed of the subject and the size of the subject for setting the determination frame. In this case, the determination frame setting unit 112 sets the determination frame by multiplying the margin ratio in accordance with the moving speed by the size coefficient in accordance with the size.

The present invention is not limited to this, and the determination frame may be set based on information of either the moving speed or the size. For example, in the case of setting the determination frame based on the moving speed, the margin width is calculated without being multiplied by the size coefficient. In the case of setting the determination frame based on the size, the margin ratio may be used in the same way as the case of the moving speed in FIG. 4B, instead of using the size coefficient in accordance with the size of the subject as in the case of FIG. 5B.

Furthermore, the determination frame may be set by adjusting (limiting) the coordinates of the determination frame based on at least one of the moving speed and the size of the subject, instead of using the margin ratio, the size coefficient and the like for the margin width of the determination frame.

(3. Trimming Processing)

The trimming processing to generate a trimming image will be described with reference to FIG. 7, FIG. 8A, FIG. 8B, and FIG. 9A to FIG. 9C. The trimming image is generated by the trimming processing unit 114 based on the trimming information generated by the trimming information generation unit 113. The trimming information generation unit 113 generates the trimming information to specify a trimming range based on the relationship between the position information of the subject which is detected by the subject detection unit 111, and the determination frame information which is set by the determination frame setting unit 112. The trimming processing unit 114 generates the trimming image based on the trimming information generated by the trimming information generation unit 113.

FIG. 7 is a flow chart exemplifying the trimming processing according to Embodiment 1. The trimming processing indicated in FIG. 7 is started, for example, when the imaging apparatus 100 is turned ON, and the trimming processing is set to ON.

In step S701, the trimming information generation unit 113 determines whether the position of the subject is included inside the determination frame. The position of the subject is expressed as the coordinates of the center of the subject, for example. Processing advances to step S702 if the position of the subject is included inside the determination frame. Processing advances to step S703 if the position of the subject is not included inside the determination frame. In the example described below, the trimming information generation unit 113 determines whether the coordinates of the center of the subject are included inside the determination frame, but the trimming information generation unit 113 may determine whether all or a part of the region of the subject is included inside the determination frame.

In step S702, the trimming information generation unit 113 generates the trimming information to display the subject at the center of the trimming image. The trimming processing unit 114 trims the subject based on the generated trimming information, and generates the trimming image.

Figure 8B:
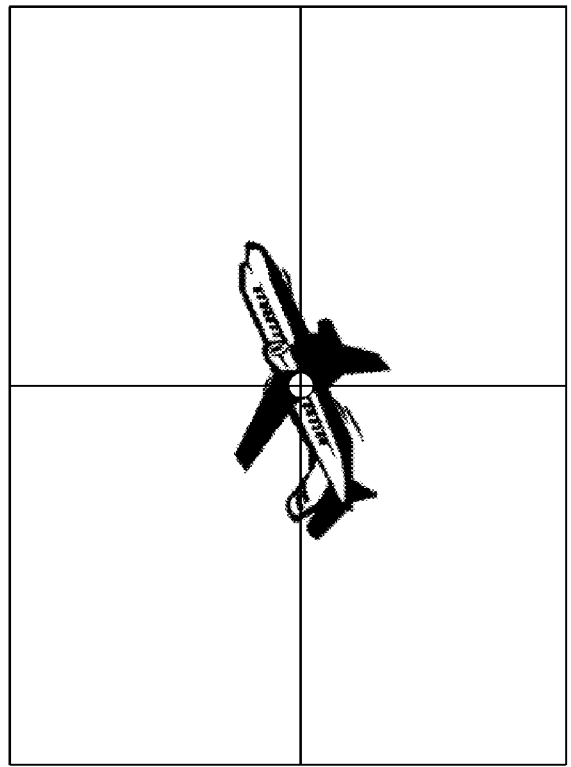
FIG. 8A and FIG. 8B are diagrams for explaining trimming in a case where the subject is inside the determination frame.
Figure 8A:
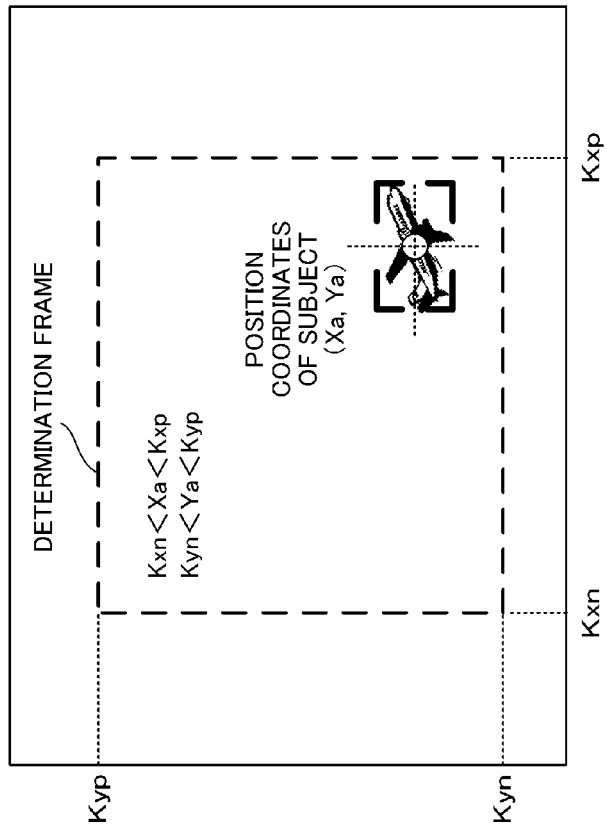

Now a specific example of the trimming processing in the case where the position of the subject is included inside the determination frame will be described with reference to FIG. 8A and FIG. 8B. FIG. 8A and FIG. 8B are diagrams for explaining trimming in the case where the subject is inside the determination frame.

FIG. 8A indicates a state where the determination frame is set in the capturing image, and the position of the subject is included inside the determination frame. It is assumed that the x coordinate of the determination frame on the positive direction side is Kxp, the x coordinate thereof on the negative direction side is Kxn, the y coordinate thereof on the positive direction side is Kyp, and the y coordinate thereof on the negative direction side is Kyn. The coordinates of the position of the subject, that is, the coordinates of the center of the subject, are (Xa, Ya). In step S701, it is determined that the position of the subject is included inside the determination frame, if the coordinates of the determination frame and the coordinates of the subject satisfy the following relationship.

$Kxn < Xa < Kxp$ $Kyn < Ya < Kyp$

FIG. 8B exemplifies a trimming image displayed with the subject at the center. In step S702, the trimming information generation unit 113 generates the trimming information to display the subject at the center of the trimming image, as illustrated in FIG. 8B. The trimming processing unit 114 generates the trimming image based on the generated trimming information.

Step S703 and step S704 in FIG. 7 are processing steps in the case where the position of the subject is not included inside the determination frame. In the case where the position of the subject is not included inside the determination frame, it is determined that the subject is in the edge region outside the determination frame, and is in a position where the subject is likely to frame out of the capturing image. In step S703, the subject detection unit 111 detects the coordinates of the subject with respect to the center of the capturing image.

In step S704, the trimming information generation unit 113 calculates the amount of shifting the subject from the center of the trimming image based on the detection result in step S703. The trimming information generation unit 113 generates the trimming information to display the subject at the position shifted from the center of the trimming image. In this case, the trimming information generation unit 113 generates the trimming information so that the direction of the subject with respect to the center of the capturing image, and the direction of the subject with respect to the center of the trimming image, are the same. The trimming processing unit 114 generates the trimming image based on the generated trimming information.

Figure 9B:
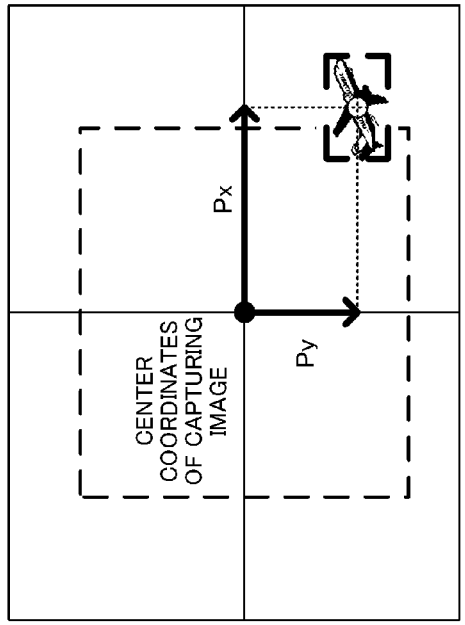
FIG. 9A to FIG. 9C are diagrams for explaining trimming in a case where the subject is not inside the determination frame.
Figure 9C:
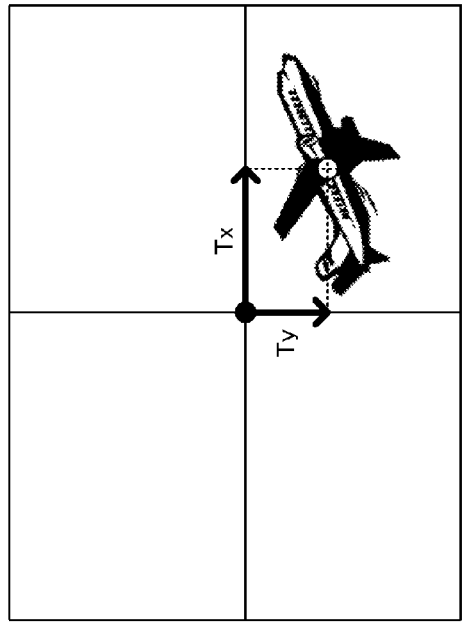
Figure 9A:
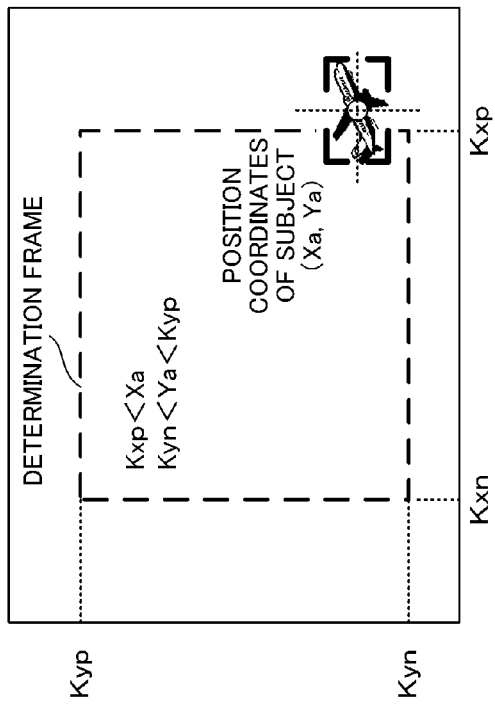

Now a specific example of the trimming processing in the case where the position of the subject is not included inside the determination frame (the position of the subject is included inside the edge region) will be described with reference to FIG. 9A to FIG. 9C. FIG. 9A to FIG. 9C are diagrams for describing the trimming in the case where the subject is not inside the determination frame. In the case where the subject is not inside the determination frame, the size of the trimming range is not changed from the case where the position of the subject is included inside the determination frame, and the position of the trimming range is changed so that the position of the subject (coordinates of the center of the subject) is shifted from the center of the trimming image.

FIG. 9A is an example of the case where the determination frame is set in the capturing image, and the position of the subject is not included inside the determination frame. Just like FIG. 8A, it is assumed that the x coordinate of the determination frame on the positive direction side is Kxp, the x coordinate thereof on the negative direction side is Kxn, the y coordinate thereof on the positive direction side is Kyp, and the y coordinate thereof on the negative direction side is Kyn. The coordinates of the position of the subject are (Xa, Ya). In step S701, it is determined that the position of the subject is included inside the determination frame if the coordinates of the determination frame and the coordinates of the subject satisfy the following relationship.

$Kxp < Xa$ $Kyn < Ya < Kyp$

FIG. 9B indicates the coordinates of the subject when the center of the capturing image is the origin. In the case where the position of the subject is not included inside the determination frame, the subject detection unit 111 detects the coordinates of the subject with respect to the center of the capturing image in step S703. In the case of FIG. 9B, the coordinates of the subject are (Px, Py) when the center of the capturing image is the origin.

FIG. 9C exemplifies a trimming image when the subject, that is shifted from the center, is displayed. In step S704, the trimming information generation unit 113 calculates the display position of the subject with respect to the center of the trimming image based on the coordinates detected in step S703, and generates the trimming information. The display position of the subject may be the coordinates of the center of the subject when the center of the trimming image is the origin. In the case of FIG. 9C, the coordinates of the display position of the subject in the trimming image are (Tx, Ty). The coordinates (Tx, Ty) of the display position of the subject in the trimming image can be acquired by multiplying the coordinates (Px, Py) of the subject in the capturing image by predetermined coefficients Kx and Ky as follows.

$Tx = Kx \times Px$ $Ty = Ky \times Py$

The predetermined coefficients Kx and Ky may be predetermined values in the X axis direction and Y axis direction respectively, based on the ratio of the size of the display unit 120 to display the trimming image, with respect to the size of the capturing image. Further, the predetermined coefficients Kx and Ky may be nonlinear values in a lookup table that is provided in advance, in accordance with the values of the coordinates (Px, Py) of the subject in the capturing image. Furthermore, instead of using the predetermined coefficients Kx and Ky, the coordinates (Tx, Ty) of the display position of the subject may be set based on the lookup table that is provided in advance, in accordance with the values of the coordinates (Px, Py) of the subject in the capturing image.

The coordinates (Tx, Ty) of the display position of the subject in the trimming image may be calculated by multiplying the widths of the protruding portions of the subject from the determination frame, instead of the coordinates (Px, Py) of the subject in the capturing image, by the predetermined coefficients Kx and Ky. In this case, it can be prevented that the subject is suddenly shifted from the center of the trimming image when the subject moves from the determination frame to the edge region.

In the case where the position of the subject is included in the edge region, it is not always necessary to shift the display position of the subject in the trimming image based on the position of the subject in the capturing image. The display position of the subject in the trimming image may be calculated considering not only the position of the subject in the capturing image, but also the moving direction and moving speed of the subject. For example, when the vectors indicating the moving direction and the moving speed of the subject are (Vx, Vy), the coordinates (Tx, Ty) of the display position of the subject in the trimming image can be calculated as follows.

$$Tx = Kx \times (Px + Vx)$$

$$Ty = Ky \times (Py + Vy)$$

Even in the case where the position of the subject is included inside the edge region, the subject may be displayed at the center of the trimming image if the moving direction of the subject is directed toward the region inside the determination frame (second region), just like the case where the position of the subject is not included inside the edge region.

The trimming processing unit 114 performs the trimming processing of the subject based on the trimming information, such as the display position of the subject in the trimming image generated by the trimming information generation unit 113, and displays the subject on the display unit 120.

According to Embodiment 1 described above, the user can recognize the possibility of a frame out in advance by the display position of the subject in the trimming image, and turn the imaging apparatus 100 to an appropriate direction. In other words, the user can continuously capture (track) the subject inside the frame by turning the image capturing direction of the camera to the direction in which the subject is likely to frame out.

In the above example, the imaging apparatus 100 changes the trimming range based on the trimming information, and shifts the display position of the subject from the center of the trimming image, so as to notify the user the direction in which the subject is likely to frame out. The present invention, however, is not limited to this. For example, the imaging apparatus 100 may perform trimming with displaying the subject at the center, and indicate the direction in which the subject is likely to frame out using an arrow mark or the like.

Figure 10:
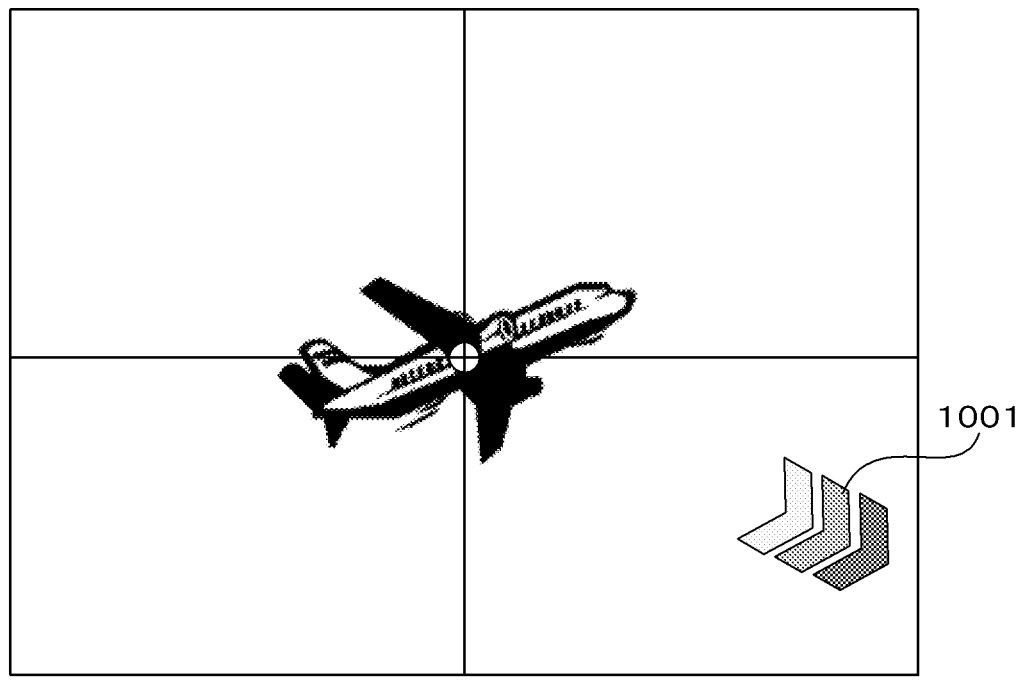
FIG. 10 is a diagram exemplifying notification information indicating a possible frame out direction.

FIG. 10 is a diagram exemplifying the notification information indicating a possible frame out direction. In the trimming image illustrated in FIG. 10, the notification information 1001 is indicated by an arrow mark indicating the direction in which the subject is likely to frame out. The notification information 1001 is generated based on the trimming information. Specifically, based on the coordinates (Tx, Ty) of the display position, the arrow mark displayed as the notification information 1001 is generated such that the direction in which the subject is likely to frame out is indicated by the direction of the arrow mark, and the distance from the center of the trimming image is indicated by the length of the arrow. The notification information 1001 may notify the degree of the possibility of a frame out of the subject from the image capturing arrange by a change in color, the flashing speed or the like of the arrow. Further, the notification information 1001 may be notified by text.

Embodiment 2

Embodiment 2 is an example of continuously changing the trimming range of the subject, without using the determination frame, based on the position information, the moving speed information and the size information of the subject.

Configuration of Imaging Apparatus

Figure 11:
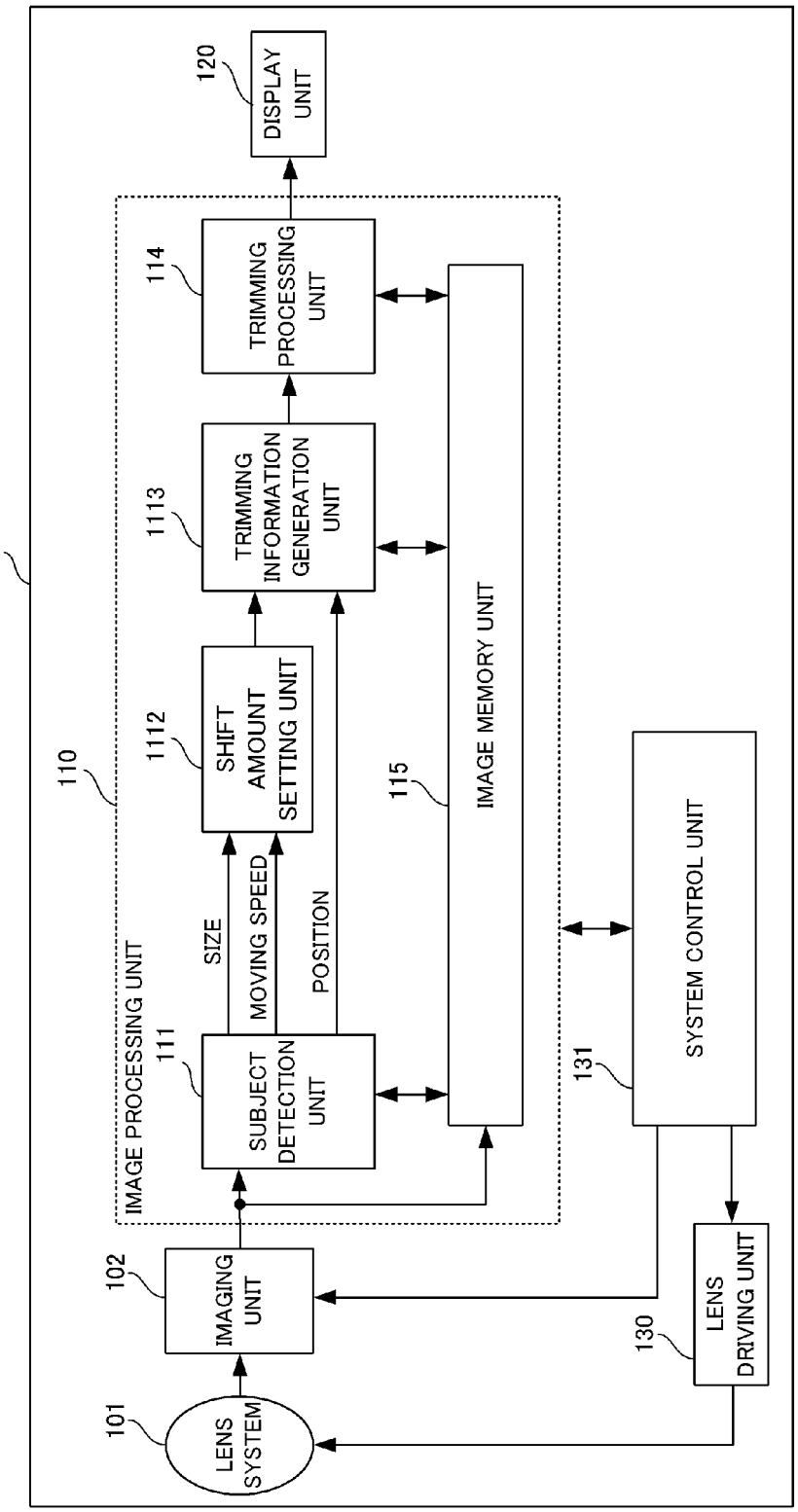
FIG. 11 is a block diagram depicting a configuration example of an imaging apparatus according to Embodiment 2.

A configuration example of the imaging apparatus 100 according to Embodiment 2 will be described with reference to FIG. 11. The imaging apparatus 100 according to Embodiment 2 includes a shift amount setting unit 1112, instead of the determination frame setting unit 112 in Embodiment 1, which is the difference from Embodiment 1. Further, the processing content of a trimming information generation unit 1113 according to Embodiment 2 is different from the trimming information generation unit 113 according to Embodiment 1. A composing element that is the same as that in each portion (block) described in Embodiment 1 is denoted with the same reference sign, and description thereof is omitted. In the following, aspects that are different from Embodiment 1 will be primarily described.

The shift amount setting unit 1112 sets a shift magnification based on the size and the moving speed of the subject detected by the subject detection unit 111. The trimming information generation unit 1113 generates the trimming information to specify the trimming range based on the position information of the subject which was detected by the subject detection unit 111 and the shift magnification which was set by the shift amount setting unit 1112. The size of the trimming range specified by the trimming information may be constant regardless the shift amount of the subject. The trimming range is specified such that the center coordinates of the subject are shifted from the center in accordance with the shift magnification.

Operation of Imaging Apparatus

FIG. 12 is a flow chart exemplifying the trimming processing according to Embodiment 2. The trimming processing indicated in FIG. 12 is started, for example, when the imaging apparatus 100 is turned ON, and the trimming processing is set to ON.

In step S1201, the subject detection unit 111 detects the coordinates of the subject with respect to the center of the capturing image. In step S1202, the shift amount setting unit 1112 calculates the amount of shifting the subject from the center based on the detection result in step S1201.

Figure 13A:
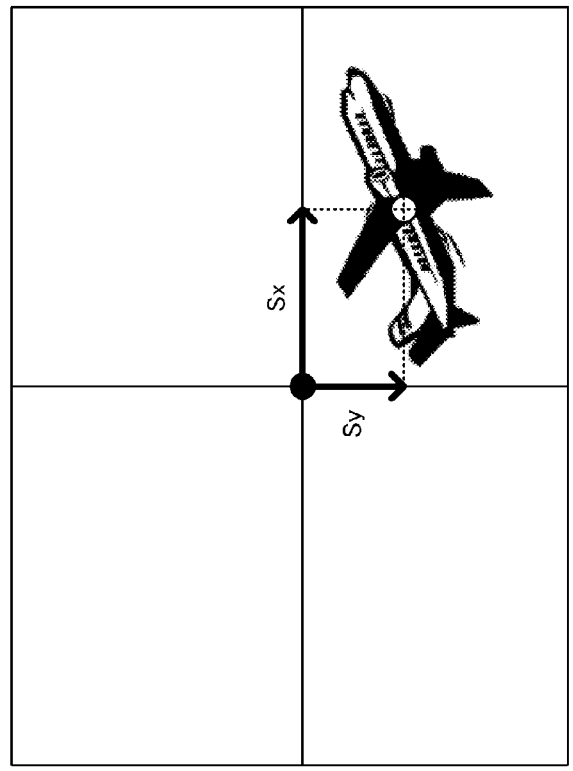
FIG. 13A and FIG. 13B are diagrams for explaining a shift amount of a subject according to Embodiment 2.

Now the shift amount of the subject according to Embodiment 2 will be described with reference to FIG. 13A and FIG. 13B. FIG. 13A exemplifies a case where the coordinates of the subject detected in step S1201 is (Px, Py) with the center coordinates of the capturing image as the origin.

Figure 13B:
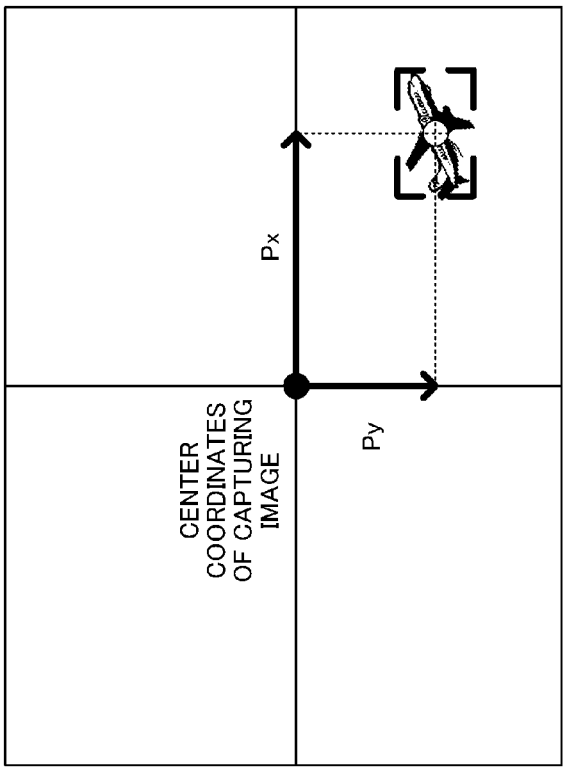

In the case of FIG. 13B, the shift amount of the subject from the center of the trimming image is Sx in the X axis direction, and Sy in the Y axis direction. The shift amount Sx of the subject in the X axis direction and the shift amount Sy thereof in the Y axis direction are determined by multiplying the coordinates (Px, Py) of the subject in the capturing image by predetermined coefficients Kx and Ky.

$$Sx = Kx \times Px$$

$$Sy = Ky \times Py$$

The predetermined coefficients Kx and Ky may be predetermined values in the X axis direction and the Y axis direction respectively, based on the ratio of the size of the display unit 120 to display the trimming image with respect to the size of the capturing image. Further, the predetermined coefficients Kx and Ky may be nonlinear values in a lookup table that is provided in advance, in accordance with the values of the coordinates (Px, Py) of the subject in the capturing image. Furthermore, instead of using the predetermined coefficients Kx and Ky, the shift amount Sx of the subject in the X axis direction and the shift amount Sy thereof in the Y axis direction may be set based on a lookup table that is provided in advance, in accordance with the values of the coordinates (Px, Py) of the subject in the capturing image.

In step S1203 in FIG. 12, the trimming information generation unit 1113 generates the trimming information of the subject based on the shift amount calculated in step S1202 and the shift magnification generated in the shift amount setting unit 1112. Specifically, the trimming information generation unit 1113 changes the calculated shift amount by multiplying a shift magnification in accordance with the moving speed and the size of the subject.

Now the shift magnification according to Embodiment 2 will be described with reference to FIG. 14A and FIG. 14B. The shift magnification is set by the shift amount setting unit 1112 based on the moving speed and the size of the subject.

FIG. 14A and FIG. 14B are examples of the shift magnification that is applied to change the shift amount in accordance with the moving speed and the size of the subject respectively. The shift magnification is a coefficient to increase the shift amount of the subject from the center of the trimming image. FIG. 14A indicates an example of the shift magnification Kv which is applied in accordance with the moving speed of the subject. In the case of FIG. 14A, the shift magnification Kv is 1.00 if the moving speed is less than 1%, 1.05 if the moving speed is at least 1% and less than 3%, and is 1.10 if the moving speed is at least 3%. Based on the shift magnification Kv in FIG. 14A, the shift amount setting unit 1112 can set a shift magnification that is larger as the moving speed of the subject increases. The shift amount of the subject from the center of the trimming image is set to a larger value as the moving speed of the subject increases. Therefore the imaging apparatus 100 can notify the user at an appropriate timing that the moving speed of the subject is increasing and the subject is approaching the edge of the capturing image.

FIG. 14B indicates an example of the shift magnification Kz which is applied in accordance with the size of the subject. In the case of FIG. 14B, the shift magnification Kz is 1.00 if the size of the subject is less than 5%, 1.03 if the size is at least 5% and less than 10%, and is 1.05 if the size is at least 10%. Based on the shift magnification Kz in FIG. 14B, the shift amount setting unit 1112 can set a shift magnification that is larger as the size of the subject increases. The shift amount of the subject from the center of the trimming image is set to be a larger value as the size of the subject increases. Therefore even if the distance from the tracking coordinates at the center of the subject to the edge of the subject increases in accordance with the size of the subject, the imaging apparatus 100 can notify the user at an appropriate timing that the subject is approaching the edge of the capturing image.

Using the shift magnification Kv and the shift magnification Kz which are set in FIG. 14A and FIG. 14B, the trimming information generation unit 1113 calculates the coordinates (Tx, Ty) of the display position of the subject in the trimming image. The coordinates (Tx, Ty) of the display position of the subject in the trimming image are determined by multiplying the shift amount Sx of the subject in the X axis direction and the shift amount Sy thereof in the Y axis direction by the shift magnification Kv and the shift magnification Kz respectively as follows.

$$Tx = Sx \times Kv \times Ks$$

$$Ty = Sy \times Kv \times Ks$$

In this sample, the common shift magnification Kv and shift magnification Kz are used for the shift amount in the X axis direction and the shift amount in the Y axis direction, but the present invention is not limited to this. A different shift magnification Kv (shift magnification based on the moving speed) and shift magnification Kz (shift magnification based on the size) may be applied to the shift amount in the X axis direction and the shift amount in the Y axis direction respectively.

The trimming processing unit 114 performs the trimming processing of the subject based on the trimming information of the subject, such as the display position of the subject in the trimming image generated by the trimming information generation unit 1113, and displays the result on the display unit 120.

According to Embodiment 2 described above, the user can quickly recognize the approach of the subject to the edge of the capturing image by the display position of the subject in the trimming image, and can turn the imaging apparatus 100 to an appropriate direction.

Embodiment 3

Embodiment 3 is an example of adjusting the optical zoom magnification in accordance with the moving speed or size of the subject, in addition to the configuration of Embodiment 1 or Embodiment 2.

(Adjustment of Optical Zoom Magnification by Monitoring Moving Speed and Size of Subject)

In a case where the moving speed of the subject becomes at least a first threshold, or the size of the subject becomes at least a third threshold, the imaging apparatus 100 controls an optical zoom magnification to be on a wide direction (wide-angle direction). Thereby the imaging apparatus 100 can widen the imaging range to track the subject without changing the trimming display of the subject.

In a case where the moving speed of the subject becomes not more than a second threshold, or the size of the subject becomes not more than a fourth threshold, the imaging apparatus 100 controls the optical zoom magnification to be on the tele direction (telephoto direction). Thereby the imaging apparatus 100 can increase the re solution of the trimming image without changing the trimming display of the subject. Here the second threshold is a value smaller than the first threshold, and the fourth threshold is a value smaller than the third threshold.

As described in FIG. 2 and FIG. 3, the moving speed or the size of the subject detected by the subject detection unit 111 is calculated as a ratio with respect to a number of pixels of the capturing image in the X axis direction and a number of pixels thereof in the Y axis direction. The moving speed and the size of the subject may be any values indicating the moving speed and the size relative to the size of the capturing image. In the description in Embodiment 3, the moving speed is a ratio of the change amount of the subject coordinates with respect to the number of pixels of the capturing image, and the size is a ratio of a number of pixels of the subject with respect to the number of pixels of the capturing image.

The configuration of the imaging apparatus 100 according to Embodiment 3 is similar to Embodiment 1 or Embodiment 2. In Embodiment 3, the optical zoom magnification is adjusted based on the moving speed and the size of the subject using the system control unit 131 or the like, which is a difference from Embodiment 1 and Embodiment 2.

The system control unit 131 according to Embodiment 3 monitors the moving speed or the size of the subject, and controls the optical zoom magnification to be on the wide direction when the moving speed or the size becomes at least a corresponding threshold. Specifically, the system control unit 131 sends a signal, to control the optical zoom magnification to be on the wide direction, to the lens driving unit 130. The lens driving unit 130 moves the lens system 101 to the sensor side of the imaging unit 102 so as to decrease the focal distance. The system control unit 131 can change the optical zoom magnification to be on the wide direction and increase the imaging range by controlling the lens driving unit 130. By widening the imaging lens, the moving speed and the size of the subject relatively become smaller with respect to the capturing image, and the imaging apparatus 100 can widen the tracking range of the subject.

In the case where the moving speed and the size of the subject become not more than corresponding thresholds, the system control unit 131 controls the optical zoom magnification to be on the tele direction. Specifically, the system control unit 131 sends a signal, to control the optical zoom magnification to be on the tele direction, to the lens driving unit 130. The lens driving unit 130 moves the lens system 101 to the opposite side of the sensor side of the imaging unit 102 so as to increase the focal distance.

In the case of controlling the optical zoom magnification to be on the wide direction or the tele direction, the trimming information generation unit 113 according to Embodiment 3 may adjust the trimming range before and after the control of the optical zoom magnification, so that the size of the subject displayed on the display unit 120 remains the same.

The system control unit 131 may monitor both the moving speed and the size of the subject to adjust the optical zoom magnification, or may monitor either one of the moving speed and the size of the subject to adjust the optical zoom magnification.

(Adjustment of Optical Zoom Magnification by Monitoring Determination Frame)

In the case of applying Embodiment 3 to Embodiment 1, the information on the determination frame that is set by the determination frame setting unit 112 may be monitored as the information for adjusting the optical zoom.

The determination frame is set based on the moving speed and the size of the subject. The determination frame is set more to an inner side of the edge of the capturing image as the moving speed and the size increase, and is set more toward the edge of the capturing image as the moving speed and the size decrease. Therefore by monitoring the position of the determination frame, the system control unit 131 can determine whether the moving speed or the size of the subject increases, and whether a frame out is more likely to occur.

Now monitoring of the position of the determination frame will be described with reference to FIG. 6. The system control unit 131 monitors the position of the determination frame that is set by the determination frame setting unit 112. In other words, the system control unit 131 monitors the x coordinate Kxp on the X axis positive direction side, the x coordinate Kxn on the X axis negative direction side, the y coordinate Kyp on the Y axis positive direction side, and the y coordinate Kyn on the Y axis negative direction side.

Specifically, the system control unit 131 controls the optical zoom magnification to be on the wide direction when any one or all of the following margin width values in the four directions of the determination frame become at least a first width.

(Nx−Kxp): a number of pixels from the boundary of the determination frame on the X axis positive direction side to the x coordinate Kxp (Kxn): a number of pixels from the boundary of the determination frame on the X axis negative direction side to the x coordinate Kxn (Ny−Kyp): a number of pixels from the boundary of the determination frame on the Y axis positive direction side to the y coordinate Kyp (Kyn): a number of pixels from the boundary of the determination frame on the Y axis negative direction side to the y coordinate Kyn Further, the system control unit 131 controls the optical zoom magnification to be on the tele direction when the margin width values of the determination frame become not more than a second width, which is smaller than the first width.

In the case where the determination frame is not a rectangle, the system control unit 131 may control the optical zoom magnification to be on the wide direction when the width between any position of the determination frame and the edge of the capturing image becomes at least a first width. Further, the system control unit 131 may control the optical zoom magnification to be on the tele direction when the width between any position of the determination frame and the edge of the capturing image becomes not more than a second width, which is smaller than the first width.

The monitoring of the position of the determination frame is not limited to the case of monitoring the coordinates of the determination frame, as mentioned above. The system control unit 131 may control the optical zoom magnification to be on the wide direction when the area inside the determination frame becomes a first area or less, and control the optical zoom magnification to be on the tele direction when the surface area inside the determination frame becomes a second area or more. The second area here is an area that is larger than the first area.

In the case where the optical zoom magnification is controlled to be on the wide direction or the tele direction, the trimming information generation unit 113 adjusts the trimming range, so that the size of the subject displayed on the display unit 120 does not change before and after the control of the optical zoom magnification.

According to Embodiment 3 described above, the imaging apparatus 100 controls the optical zoom magnification to be on the wide direction when the moving speed and the size of the subject indicate that a frame out is likely to occur. Thereby the imaging apparatus 100 can widen the imaging range to track the subject without changing the trimming display of the subject. In the case where the moving speed or the size of the subject is smaller than the respective threshold, the optical zoom magnification may be controlled to be on the tele direction.

Embodiment 4

In Embodiment 4, in addition to the configuration of Embodiment 1 or 2, the optical zoom magnification is adjusted to be on the wide direction in a case where the subject is likely to frame out because the user position is unstable and moves frequently. Thereby the imaging apparatus 100 can widen the imaging range to track the subject without changing the trimming display of the subject. Embodiment 4 is a case where the position of the subject image in the capturing image greatly changes not because of the motion of the subject but because of the motion of the user, which is the difference from Embodiment 3.

For the moving speed of the subject detected by the subject detection unit 111, the tracking coordinates of the subject are detected at predetermined time intervals, and the change amount based on the size of the capturing image is calculated, as described in FIG. 3. In the case where the stability of the user position is poor, the imaging apparatus 100 is shaken vertically and horizontally, hence the moving speed of the subject oscillates in both the positive direction and the negative direction in accordance with the motion of the imaging apparatus 100.

The system control unit 131 monitors the moving speed detected by the subject detection unit 111, and sends a signal, to control the optical zoom magnification to be on the wide direction, to the lens driving unit 130 in the case where the moving speed oscillates at least in a predetermined amplitude for at least a predetermined number of times within a predetermined period of time.

The predetermined time may be a time 10 times the detection interval by the subject detection unit 111, for example. The case where the moving speed oscillates at least in a predetermined amplitude for at least a predetermined number of times within a predetermined period time is a case where the moving speed oscillates at least in a ±2% amplitude for at least 3 times within a predetermined period of time, for example. In the case of controlling the optical zoom magnification to be on the wide direction, the trimming information generation unit 113 adjusts the trimming range so that the size of the subject displayed on the display unit 120 does not change before and after the control of the optical zoom magnification.

According to Embodiment 4 described above, the imaging apparatus 100 controls the optical zoom magnification to be on the wide direction in the case where the subject is likely to frame out because the user position is not stable and the imaging apparatus 100 is shaken vertically and horizontally. Thereby the imaging apparatus 100 can widen the imaging range to track the subject without changing the trimming display of the subject.

Preferred embodiments of the present invention have been described, but the present invention is not limited to these embodiments, and may be modified and changed in various ways within the scope of the essence thereof. The configuration and processing described in each embodiment may be freely combined as long as no technical inconsistency is generated.

The present invention can support the user continuously observing the moving subject without a frame out while trimming the subject.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-083952, filed on May 12, 2020, which is hereby incorporated by reference herein in its entirety.

What is claimed is:

1. An imaging apparatus comprising:
   a detection unit configured to detect a position of a subject in an image; and
   a generation unit configured to generate a trimming image by trimming the image so that the subject is displayed on the trimming image,
   wherein the image has a first region, which includes an edge of the image, and a second region, which is a region of the image excluding the first region,
   wherein the generation unit generates the trimming image to notify a user that the subject is likely to move out of an imaging range of the image, in a case where the position of the subject is included in the first region,
   wherein the generation unit generates the trimming image by performing trimming so that the subject is displayed at a center of the trimming image in a case where the position of the subject is included in the second region, or by performing trimming so that the subject is displayed at a position shifted from the center of the trimming image on the basis of the position of the subject with respect to the center of the image in a case where the position of the subject is included in the first region, and
   wherein the detection unit and the generation unit are implemented by
      at least one processor and at least one memory of the imaging apparatus, and/or
      at least one circuit of the imaging apparatus.

2. The imaging apparatus according to claim 1, further comprising a setting unit configured to set a determination frame that separates the first region and the second region from each other,
  wherein the setting unit is implemented by
    at least one processor and at least one memory of the imaging apparatus, and/or
    at least one circuit of the imaging apparatus.

3. The imaging apparatus according to claim 2, wherein the detection unit is further configured to detect at least one of moving speed and a size of the subject, and
  the setting unit is configured to set the determination frame on the basis of a detection result by the detection unit.

4. The imaging apparatus according to claim 3, wherein the setting unit is configured to set the size of the determination frame smaller as the moving speed of the subject is faster or the size of the subject is larger.

5. The imaging apparatus according to claim 4, wherein the determination frame is a rectangle, and the determination frame is set by adjusting a margin width between each side of the determination frame and the edge of the image in accordance with a magnitude of a component of the moving speed of the subject along a direction of each side, or the size of the subject along the direction of each side.

6. The imaging apparatus according to claim 1, wherein the generation unit is configured to perform trimming so that the direction of the subject with respect to the center of the image and the direction of the subject with respect to the center of the trimming image are the same.

7. The imaging apparatus according to claim 1, wherein the generation unit is configured to display, on the trimming image, notification information indicating a direction in which the subject is likely to move out of an imaging range of the image.

8. The imaging apparatus according to claim 7, wherein the generation unit is configured to display notification information using an arrow mark that indicates a direction in which the subject is likely to move out of the imaging range of the image, and that has a length, a color or a blinking speed in accordance with the distance from a center of the trimming image to the subject.

9. The imaging apparatus according to claim 2, further comprising a control unit configured to control an optical zoom magnification to be on a wide-angle direction in a case where a distance between any position of the determination frame and the edge of the image becomes at least a first width, and to control the optical zoom magnification to be on a telephoto direction in a case where the distance between any position of the determination frame and the edge of the image becomes not more than a second width, which is smaller than the first width,
  wherein the control unit is implemented by
    at least one processor and at least one memory of the imaging apparatus, and/or
    at least one circuit of the imaging apparatus.

10. The imaging apparatus according to claim 9, wherein the generation unit is configured to adjust a trimming range so that a size of the subject in the trimming image is not changed before and after the control unit controls the optical zoom magnification to be on the wide-angle direction or the telephoto direction.

11. The imaging apparatus according to claim 2 further comprising a control unit configured to control an optical zoom magnification to be on a wide-angle direction in a case where an area on an inside of the determination frame becomes not more than a first area, and to control the optical zoom magnification to be on a telephoto direction in a case where the area on the inside of the determination frame becomes at least a second area, which is larger than the first area,
  wherein the control unit is implemented by
    at least one processor and at least one memory of the imaging apparatus, and/or
    at least one circuit of the imaging apparatus.

12. The imaging apparatus according to claim 1, wherein the detection unit is configured to detect moving speed of the subject,
  wherein the imaging apparatus further comprises a control unit configured to control an optical zoom magnification to be on a wide-angle direction in a case where the moving speed of the object becomes at least a first threshold, and to control the optical zoom magnification to be on a telephoto direction in a case where the moving speed of the subject becomes not more than a second threshold, which is smaller than the first threshold, and
  wherein the control unit is implemented by
    at least one processor and at least one memory of the imaging apparatus, and/or
    at least one circuit of the imaging apparatus.

13. The imaging apparatus according to claim 1, wherein the detection unit is configured to detect a size of the subject,
  wherein the imaging apparatus further comprises a control unit configured to control an optical zoom magnification to be on a wide-angle direction in a case where the size of the object becomes at least a third threshold, and to control the optical zoom magnification to be on a telephoto direction in a case where the size of the subject becomes not more than a fourth threshold, which is smaller than the third threshold, and
  wherein the control unit is implemented by
    at least one processor and at least one memory of the imaging apparatus, and/or
    at least one circuit of the imaging apparatus.

14. The imaging apparatus according to claim 1, wherein the detection unit is configured to detect moving speed of the subject,
  wherein the imaging apparatus further comprises a control unit configured to control an optical zoom magnification to be on a wide-angle direction in a case where the moving speed of the subject oscillates in at least a predetermined amplitude for at least a predetermined number of times within a predetermined period of time, and
  wherein the control unit is implemented by
    at least one processor and at least one memory of the imaging apparatus, and/or
    at least one circuit of the imaging apparatus.

15. A control method for an imaging apparatus, the method comprising:
  a step of detecting a position of a subject in an image; and
  a step of generating a trimming image by trimming the image so that the subject is displayed on the trimming image,
  wherein the image has a first region, which includes an edge of the image, and a second region, which is a region of the image excluding the first region, and
  wherein, in the generating step, the trimming image to notify a user that the subject is likely to move out of an imaging range of the image is generated, in a case where the position of the subject is included in the first region, and wherein, in the generating step, the trimming image is generated by performing trimming so that the subject is displayed at a center of the trimming image in a case where the position of the subject is included in the second region, or by performing trimming so that the subject is displayed at a position shifted from the center of the trimming image on the basis of the position of the subject with respect to the center of the image in a case where the position of the subject is included in the first region.

16. A non-transitory computer-readable medium that stores a program, wherein the program causes a computer to execute:

a step of detecting a position of a subject in an image; and a step of generating a trimming image by trimming the image so that the subject is displayed on the trimming image, wherein the image has a first region, which includes an edge of the image, and a second region, which is a region of the image excluding the first region, and wherein, in the generating step, the trimming image to notify a user that the subject is likely to move out of an imaging range of the image is generated, in a case where the position of the subject is included in the first region, and wherein, in the generating step, the trimming image is generated by performing trimming so that the subject is displayed at a center of the trimming image in a case where the position of the subject is included in the second region, or by performing trimming so that the subject is displayed at a position shifted from the center of the trimming image on the basis of the position of the subject with respect to the center of the image in a case where the position of the subject is included in the first region.

* * * * *